United States Patent [19]

Moe et al.

[11] Patent Number: 5,737,003
[45] Date of Patent: Apr. 7, 1998

[54] SYSTEM FOR REGISTRATION OF COLOR SEPARATION IMAGES ON A PHOTOCONDUCTOR BELT

[75] Inventors: Edward J. Moe, St. Paul, Minn.; William D. Edwards, Houlton, Wis.; Truman F. Kellie, Lakeland; Michael R. Bury, White Bear Lake, both of Minn.

[73] Assignee: Imation Corp., Saint Paul, Minn.

[21] Appl. No.: 808,711

[22] Filed: Feb. 28, 1997

Related U.S. Application Data

[63] Continuation of Ser. No. 560,330, Nov. 17, 1995, abandoned.

[51] Int. Cl.[6] ............... G03G 15/00; G03G 15/04; H04N 1/04
[52] U.S. Cl. .................. 347/116; 347/234; 399/38; 399/165
[58] Field of Search ................ 347/116, 234, 347/248, 129, 118; 399/165, 162, 38, 301

[56] References Cited

U.S. PATENT DOCUMENTS

| | | | |
|---|---|---|---|
| 3,156,129 | 11/1964 | Greiner, Jr. | 474/104 |
| 3,161,283 | 12/1964 | Knab et al. | 198/806 |
| 3,407,673 | 10/1968 | Slezak | 474/104 |
| 3,789,552 | 2/1974 | Bradbury et al. | 451/297 |
| 4,021,031 | 5/1977 | Meihofer et al. | 226/20 |
| 4,077,579 | 3/1978 | Seleski et al. | 242/563.1 |
| 4,170,175 | 10/1979 | Conlon, Jr. | 346/74.2 |
| 4,196,803 | 4/1980 | Lovett | 198/806 |
| 4,337,598 | 7/1982 | Barth et al. | 451/1 |
| 4,344,693 | 8/1982 | Hamaker | 335/212 |
| 4,462,676 | 7/1984 | Shimura et al. | 355/203 |
| 4,494,865 | 1/1985 | Andrus et al. | 355/32 |
| 4,527,686 | 7/1985 | Satoh | 198/807 |
| 4,893,740 | 1/1990 | Hediger et al. | 226/23 |
| 4,912,491 | 3/1990 | Hoshino et al. | 347/116 |
| 5,175,570 | 12/1992 | Haneda et al. | 347/116 |
| 5,184,424 | 2/1993 | Miller | 451/297 |
| 5,257,037 | 10/1993 | Haneda et al. | 347/118 |
| 5,260,725 | 11/1993 | Hammond | 347/116 X |
| 5,278,587 | 1/1994 | Strauch et al. | 347/118 |
| 5,302,973 | 4/1994 | Costanza et al. | 347/116 X |
| 5,319,537 | 6/1994 | Powers et al. | 347/232 |
| 5,339,150 | 8/1994 | Hubble, III et al. | 355/208 |
| 5,351,070 | 9/1994 | Hinton et al. | 347/242 |
| 5,369,477 | 11/1994 | Foote et al. | 355/256 |
| 5,381,167 | 1/1995 | Fujii et al. | 347/116 |
| 5,394,223 | 2/1995 | Hart et al. | 355/212 |
| 5,412,409 | 5/1995 | Costanza | 347/118 |
| 5,442,388 | 8/1995 | Schieck | 347/116 |
| 5,450,119 | 9/1995 | Hinton et al. | 347/242 |
| 5,510,877 | 4/1996 | deJong et al. | 355/208 |

FOREIGN PATENT DOCUMENTS

| | | |
|---|---|---|
| 0 547 854 | 6/1993 | European Pat. Off. . |
| 0 619 528 | 10/1994 | European Pat. Off. . |
| 0 679 018 | 10/1995 | European Pat. Off. . |
| 4016979 | 1/1992 | Japan . |
| 4181276 | 6/1992 | Japan . |

OTHER PUBLICATIONS

"Web Tracking Device with Ramp Support Means", *Research Disclosure*, Nov. 1991, pp. 836-839.

*Primary Examiner*—Arthur T. Grimley
*Assistant Examiner*—Sophia S. Chen
*Attorney, Agent, or Firm*—William D. Bauer

[57] ABSTRACT

A system for registration of color separation images on a photoconductor belt in an imaging system operates to detect a position of an edge of the photoconductor belt. The registration system detects the position with the same laser scanner used for forming latent images on the photoconductor belt. The registration system includes a belt steering control system that steers the photoconductor belt based on the detected position to reduce deviation of the belt from a continuous transport path. The registration system also may include a scan control system that, based on the detected position, controls the modulation of laser beams scanned to form latent images on the photoconductor belt. By controlling belt steering and laser beam scanning, the registration system maintains the image quality of a final multi-color image upon transfer of registered color separation images to an output substrate.

27 Claims, 6 Drawing Sheets

SYSTEM FOR REGISTRATION OF COLOR SEPARATION IMAGES ON A PHOTOCONDUCTOR BELT

This is a continuation of application Ser. No. 08/560,330 filed Nov. 17, 1995, abd.

FIELD

The present invention relates to multi-color imaging and, more particularly, to techniques for registering one or more color separation images on a photoconductor belt.

BACKGROUND

In a multi-color electrophotographic imaging system, latent images are formed in an imaging region of a moving photoconductor. Each of the latent images is representative of one of a plurality of different color separation images. The color separation images together define an overall multi-color image. The color separation images may define, for example, yellow, magenta, cyan, and black components that, upon subtractive combination on output media, produce a visible representation of the multi-color image. Prior to an imaging cycle, a uniform charge is applied to the surface of the photoconductor. Each of the latent images is formed by scanning a modulated laser beam across the moving photoconductor to selectively discharge the photoconductor in an image-wise pattern. Appropriately colored developers are applied to the photoconductor after each latent image is formed to develop the latent images. The resulting color separation images ultimately are transferred to the output media to form the multi-color image.

In some electrophotographic imaging systems, the latent images are formed and developed on top of one another in a common imaging region of the photoconductor. The latent images can be formed and developed in multiple passes of the photoconductor around a continuous transport path. Alternatively, the latent images can be formed and developed in a single pass of the photoconductor around the continuous transport path. A single-pass system enables multi-color images to be assembled at extremely high speeds. An example of an electrophotographic imaging system configured to assemble a multi-color image in a single pass of a photoconductor is disclosed in copending and commonly assigned U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM."

In an electrophotographic imaging system as described above, the latent images must be formed in precise registration with one another to produce a high quality image. In systems incorporating a photoconductor belt, precise registration can be difficult due to deviation of the belt from the transport path in a direction perpendicular to the transport path. Specifically, the photoconductor belt can undergo side-to-side movement during travel. The imaging region in which the latent images are formed is fixed relative to the edge of the photoconductor belt. However, the scanning beam used to form each latent image in the imaging region is fixed relative to a start-of-scan coordinate. The side-to-side movement of the photoconductor belt can cause movement of the imaging region relative to the start-of-scan coordinate. As a result, misregistration can occur between different scan lines and between different latent images. This misregistration can significantly degrade image quality. In particular, the misregistration can produce visible artifacts in the final multi-color image upon transfer of the misregistered color separation images to the output media.

SUMMARY OF THE INVENTION

The present invention is directed to a system for registration of one or more color separation images on a photoconductor belt. The registration system operates to detect a position of an edge of the photoconductor belt with the same laser scanner used for forming latent images on the photoconductor belt. In this manner, the registration system detects deviation of the photoconductor belt from the continuous transport path. The registration system includes a belt steering control system that steers the photoconductor belt based on the detected position to reduce deviation of the belt from a continuous transport path. The registration system also may include a scan control system that, based on the detected position, controls the modulation of laser beams scanned to form latent images on the photoconductor belt. By controlling belt steering and laser beam scanning, the registration system maintains the image quality of a final multi-color image upon transfer of registered color separation images to an output substrate.

In a first embodiment, the present invention provides a system for registration of a latent image on a photoconductor belt, the system comprising a photoconductor belt mounted about a plurality of rollers, a drive mechanism for driving the photoconductor belt to move about the rollers in a continuous path, wherein the photoconductor belt tends to deviate from the continuous path in a direction substantially perpendicular to the continuous path, a photodetector disposed to overlap an edge of the photoconductor belt, a scanner for scanning a laser beam across the moving photoconductor belt and across the photodetector, the photodetector generating a belt edge detection signal when the laser beam is scanned across the photodetector, a scan controller for modulating the laser beam based on image data to form the latent image on the photoconductor belt, a belt steering mechanism for moving the photoconductor belt in the direction substantially perpendicular to the continuous path, and a belt steering controller for controlling the belt steering mechanism based on the belt edge detection signal to reduce deviation of the photoconductor belt from the continuous path.

In a second embodiment, the present invention provides a system for registration of a plurality of latent images on a photoconductor belt, the system comprising a photoconductor belt mounted about a plurality of rollers, a drive mechanism for driving the photoconductor belt to move about the rollers in a continuous path, wherein the photoconductor belt tends to deviate from the continuous path in a direction substantially perpendicular to the continuous path, a photodetector disposed to overlap an edge of the photoconductor belt, a first scanner for scanning a first laser beam across the moving photoconductor belt and across the photodetector, the photodetector generating a belt edge detection signal when the first laser beam is scanned across the photodetector, a second scanner for scanning a second laser beam across the moving photoconductor belt, a scan controller for modulating the first laser beam based on first image data to form a first latent image on the photoconductor belt, and modulating the second laser beam based on second image data to form a second latent image on the photoconductor belt, a belt steering mechanism for moving the photoconductor belt in the direction substantially perpendicular to the continuous path, and a belt steering controller for controlling the belt steering mechanism based on the belt edge detection signal to reduce deviation of the photoconductor belt from the continuous path.

In a third embodiment, the present invention provides a system for registration of a plurality of latent images on a photoconductor belt, the system comprising a photoconductor belt mounted about a plurality of rollers, a drive mechanism for driving the photoconductor belt to move about the rollers in a continuous path, wherein the photoconductor belt deviates from the continuous path in a direction substantially perpendicular to the continuous path, a first photodetector disposed to overlap an edge of the photoconductor belt, a second photodetector disposed to overlap the edge of the photoconductor belt, a first scanner for scanning a first laser beam across the moving photoconductor belt and across the first photodetector, the first photodetector generating a first belt edge detection signal when the first laser beam is scanned across the first photodetector, a second scanner for scanning a second laser beam across the moving photoconductor belt and across the second photodetector, the second photodetector generating a second belt edge detection signal when the second laser beam is scanned across the second photodetector, a scan controller for modulating the first laser beam based on first image data to form a first latent image on the photoconductor belt, and modulating the second laser beam based on second image data to form a second latent image on the photoconductor belt, a belt steering mechanism for moving the photoconductor belt in the direction substantially perpendicular to the continuous path, and a belt steering controller for controlling the belt steering mechanism based on the first belt edge detection signal and the second belt edge detection signal to reduce deviation of the photoconductor belt from the continuous path.

In a fourth embodiment, the present invention provides a system for registration of a plurality of latent images on a photoconductor belt, the system comprising a photoconductor belt mounted about a plurality of rollers, a drive mechanism for driving the photoconductor belt to move about the rollers in a continuous path, wherein the photoconductor belt deviates from the continuous path in a direction substantially perpendicular to the continuous path, a first photodetector disposed to overlap an edge of the photoconductor belt, a second photodetector disposed to overlap the edge of the photoconductor belt, a first scanner for scanning a first laser beam across the moving photoconductor belt and across the first photodetector, the first photodetector generating a first belt edge detection signal when the first laser beam is scanned across the first photodetector, a second scanner for scanning a second laser beam across the moving photoconductor belt and across the second photodetector, the second photodetector generating a second belt edge detection signal when the second laser beam is scanned across the second photodetector, a scan controller for modulating the first laser beam based on first image data to form a first latent image on the photoconductor belt, and modulating the second laser beam based on second image data to form a second latent image on the photoconductor belt, a belt steering mechanism for moving the photoconductor belt in the direction substantially perpendicular to the continuous path, and a belt steering controller for controlling the belt steering mechanism based on the first belt edge detection signal and the second belt edge detection signal to reduce deviation of the photoconductor belt from the continuous path.

The advantages of the present invention will be set forth in part in the description that follows, and in part will be apparent from the description, or may be learned by practice of the present invention. The advantages of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION

Figure 1:
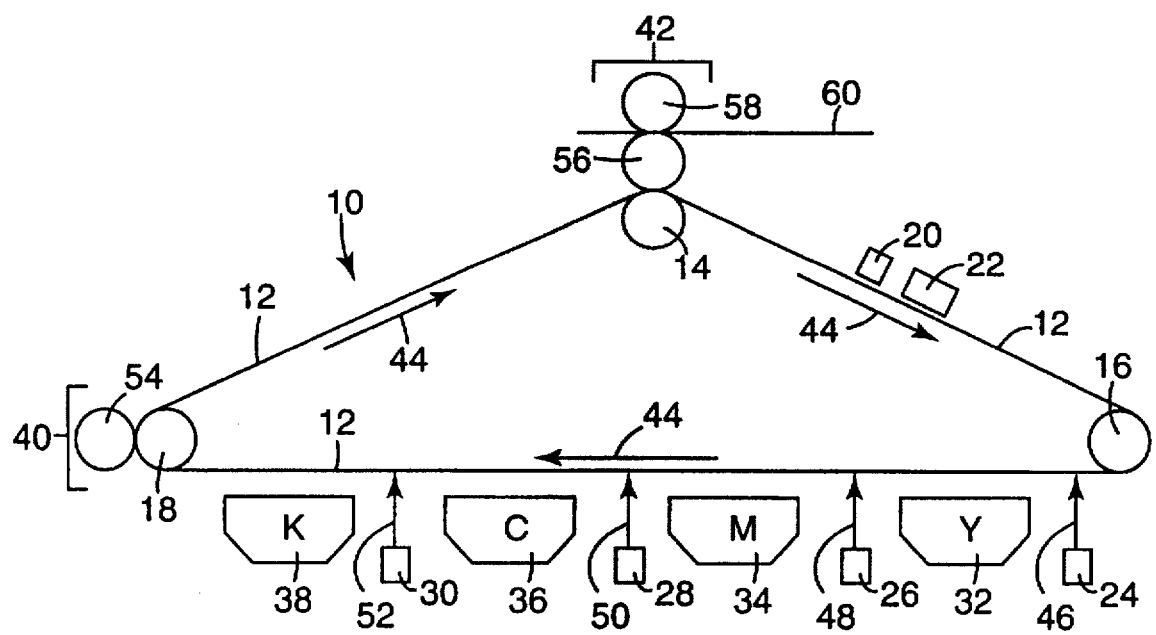
FIG. 1 is a schematic diagram conceptually illustrating an exemplary electrophotographic imaging system.

FIG. 1 is a schematic diagram conceptually illustrating an exemplary electrophotographic imaging system 10. In the example of FIG. 1, imaging system 10 includes a photoconductor belt 12 mounted about a plurality of rollers 14, 16, 18, an erasure station 20, a charging station 22, a plurality of scanners 24, 26, 28, 30, a plurality of development stations 32, 34, 36, 38, a drying station 40, and a transfer station 42. The imaging system 10 forms a multi-color image in a single pass of photoconductor belt 12 around a continuous transport path. An imaging system capable of assembling a multi-color image in a single pass of a photoconductor is disclosed, for example, in copending and commonly assigned U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM." The entire content of the above-referenced patent application is incorporated herein by reference.

In operation of system 10, photoconductor belt 12 is driven to travel in a first direction indicated by arrows 44 along the continuous transport path. As photoconductor belt 12 moves along the transport path, erasure station 20 uniformly discharges any charge remaining on the belt from a previous imaging operation. The photoconductor belt 12 then encounters charging station 22, which uniformly charges the belt to a predetermined level. The scanners 24, 26, 28, 30 selectively discharge an imaging region of photoconductor belt 12 with laser beams 46, 48, 50, 52, respectively, to form latent electrostatic images. Each latent image is representative of one of a plurality of color separation images.

As shown in FIG. 1, each development station 32, 34, 36, 38 is disposed after one of scanners 24, 26, 28, 30, relative to the direction 44 of movement of photoconductor belt 12. Each of development stations 32, 34, 36, 38 applies a developer having a color appropriate for the color separation image represented by the particular latent image formed by the preceding scanner 24, 26, 28, 30. In the example of FIG. 1, development stations 32, 34, 36, 38 apply yellow (Y), magenta (M), cyan (C), and black (K) developers, respectively, to photoconductor belt 12. A suitable developer is disclosed, for example, in copending and commonly assigned U.S. patent application Ser. No. 08/536,856 to Baker et al., filed Sep. 29, 1995, entitled "LIQUID INK USING A GEL ORGANOSOL", and bearing attorney docket no. 52069USA8A. The entire content of the above-referenced patent application is incorporated herein by reference.

As photoconductor belt 12 continues to move in direction 44, the next scanner 26, 28, 30 begins to form a latent image in the imaging region in registration with the latent image formed by the preceding scanner and developed by the preceding development station 32, 34, 36. Thus, the color separation images are formed in registration on top of one another in the same imaging region. The scanners 24, 26, 28, 30 and development stations 32, 34, 36, 38 may be spaced such that an entire latent image is formed and developed prior to formation and development of the next latent image. For increased speed and reduced size, however, each scanner 26, 28, 30 and development station 34, 36, 38 preferably begins formation and development of the next latent image prior to complete formation and development of the preceding latent image.

After scanners 24, 26, 28, 30 and development stations 32, 34, 36, 38 have formed and developed the latent images, the imaging region of the moving photoconductor belt 12 encounters drying station The drying station 40 may include a heated roller that forms a nip with belt roller 18. The heated roller 54 applies heat to photoconductor belt 12 to dry the developer applied by development stations 32, 34, 36, 38. The imaging region of photoconductor belt 12 next arrives at transfer station 42. The transfer station 42 includes an intermediate transfer roller 56 that forms a nip with photoconductor belt 12 over belt roller 14 and a pressure roller 58 that forms a nip with the intermediate transfer roller. The developer on photoconductor belt 12 transfers from the photoconductor belt surface to intermediate transfer roller 56 by selective adhesion. The pressure roller 58 serves to transfer the image on intermediate transfer roller 56 to an output substrate 60 by application of pressure and/or heat to the output substrate. The output substrate 60 may comprise, for example, paper or film.

Figure 2:
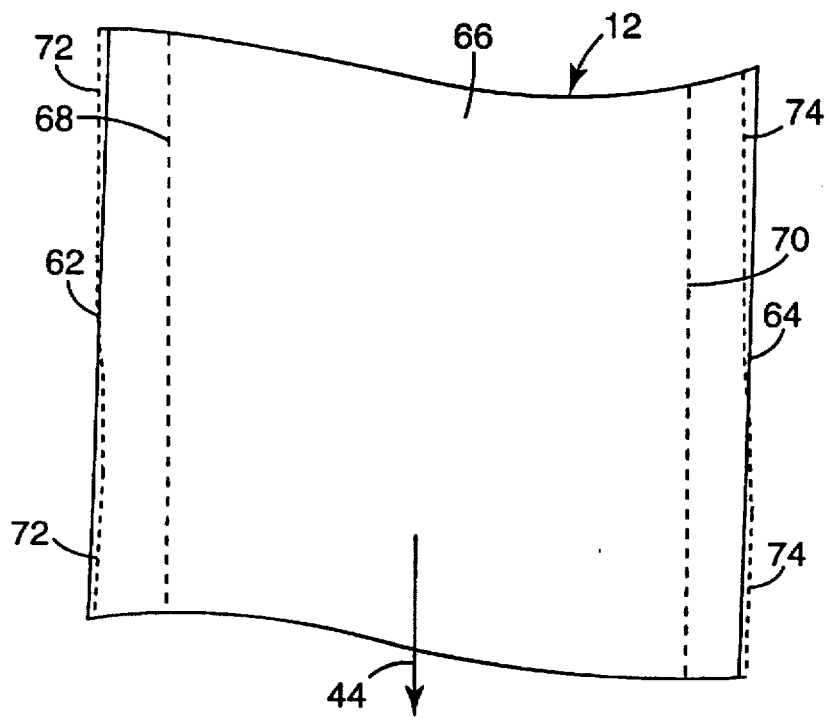
FIG. 2 is a top plan view of an exemplary photoconductor belt used in the electrophotographic imaging system of FIG. 1.

FIG. 2 is a top plan view of an exemplary photoconductor belt 12 for use in electrophotographic imaging system 10 of FIG. 1. As shown in FIG. 2, photoconductor belt 12 includes a left belt edge 62 and a right belt edge 64. The photoconductor belt 12 also includes an imaging region 66. The imaging region 66 includes a left margin 68 positioned at a fixed distance relative to left belt edge 62, and a right margin 70 positioned at a fixed distance relative to right belt edge 64. The left and right margins 68, 70 define the width of imaging region 66 extending in a direction perpendicular to the direction 44 of movement of photoconductor belt 12. The imaging region 66 also has a length defined by top and bottom margins not shown in FIG. 2.

Each scanner 24, 26, 28, 30 is oriented to scan the respective laser beam 46, 48, 50, 52 across the width of imaging region 66 in a scan line. Movement of photoconductor belt 12 in direction 44 relative to each scanner 24, 26, 28, 30 produces a plurality of scan lines on the belt. The laser beam is modulated based on image data representative of the latent image such that each of the scan lines includes an image scan segment. The image scan segments ideally extend between the left and right margins 68, 70 and together form a latent image in imaging region 66. The first and second belt edges 62, 64 ideally extend parallel to direction 44 of movement of photoconductor belt 12. As indicated by dashed lines 72, 74, however, photoconductor belt 12 can move from side to side during travel in direction 44, deviating slightly from the transport path.

To produce a high quality image, the latent images formed by scanners 24, 26, 28, 30 must be formed in precise registration with one another in imaging region 66. Precise registration can be difficult due to the side-to-side movement of photoconductor belt 12 during travel. The left and right margins 68, 70 of imaging region 66 are fixed relative to the left and right edges 62, 64, respectively, of photoconductor belt 12. In contrast, the scan lines and image scan segments of scanners 26, 28, 30 generally are fixed relative to a start-of-scan coordinate. The side-to-side movement of photoconductor belt 12 can cause movement of imaging region 66 relative to the start-of-scan coordinate. As a result, misregistration can occur between different scan lines and between different latent images. This misregistration can significantly degrade image quality. In particular, the misregistration can produce visible artifacts in the ultimate multi-color image upon transfer of the misregistered color separation images to output substrate 60.

In accordance with the present invention, there is provided a system for registration of color separation images on photoconductor belt 12. The registration system of the present invention operates to detect a position of an edge of photoconductor belt 12. Based on the detected position, the registration system may perform two different functions to ensure precise registration of the color separation images. First, the registration system includes a belt steering control system for steering photoconductor belt 12 based on the detected position to reduce deviation of the belt from the continuous transport path. Second, the registration system may further incorporate a scan control system for controlling the laser beams 46, 48, 50, 52 scanned by scanners 24, 26, 28, 30 based on the detected position. In particular, the scan control system controls modulation of each laser beam 46, 48, 50, 52 based on the detected position to start each of the image scan segments at a fixed distance relative to one of edges 62, 64 of photoconductor belt 12. By controlling belt steering and laser beam scanning, the registration system of the present invention maintains the image quality of the multi-color image upon transfer of the registered color separation images to output substrate 60.

In the example of FIG. 1, imaging system 10 is a four-color imaging system. However, the registration system of the present invention can be readily applied to provide registration of any number of one or more latent images on a photoconductor belt. In addition, although imaging system 10 is shown as a multi-color/single-pass system in FIG. 1, the registration system of the present invention can be readily applied to multi-pass electrographic imaging systems requiring common registration of color separation images on a photoconductor belt. In a multi-pass imaging system, side-to-side movement of the photoconductor belt may be somewhat periodic. Thus, misregistration between consecutive latent images may be more predictable than in a single-pass system. Nevertheless, a registration system, in accordance with the present invention, is useful in a multi-pass system to improve image quality.

Figure 3:
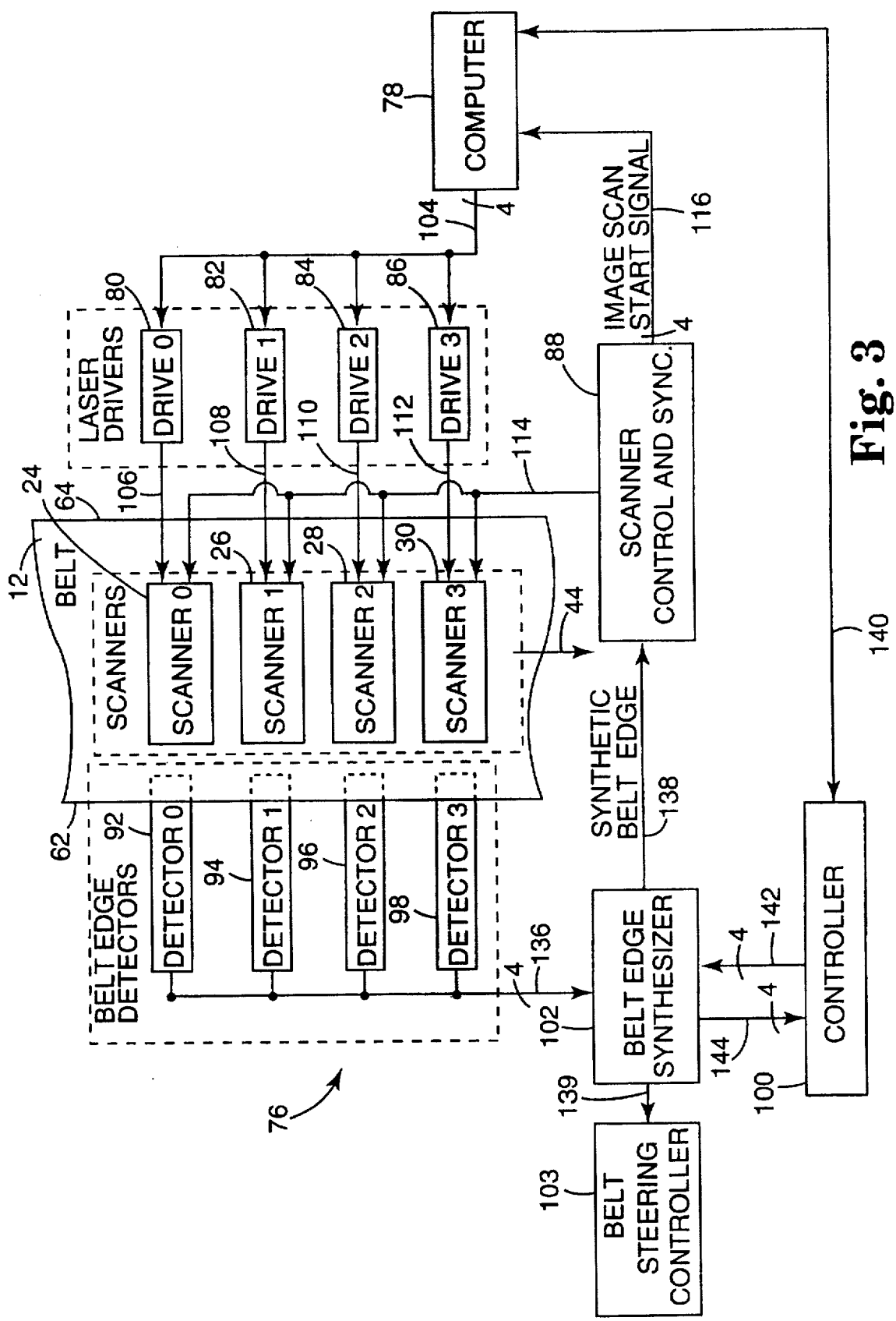
FIG. 3 is a functional block diagram illustrating a system for registration of one or more color separation images on a photoconductor belt, in accordance with the present invention.

FIG. 3 is a functional block diagram illustrating an exemplary embodiment of a system 76 for registration of color separation images on photoconductor belt 12, in accordance with the present invention. In the example of FIG. 3, registration system 76 includes scanners 24, 26, 28, 30, a computer 78, a plurality of laser drivers 80, 82, 84, 86, a scanner control and synchronization module 88, one or more belt edge detectors 92, 94, 96, 98, a controller 100, a belt edge synthesizer 102, and a belt steering controller 103. The registration system 76 of FIG. 3 provides registration of color separation images relative to an edge of the moving photoconductor belt 12. In the example of FIG. 3, registration system 76 provides registration relative to left edge 62. However, registration could be carried out relative to right edge 64.

In accordance with the present invention, each scanner 24, 26, 28, 30 is oriented to scan a laser beam 46, 48, 50, 52 in a scan line across photoconductor belt 12 and across a belt edge detection region adjacent to left edge 62 of the belt. The belt edge detection region alternatively could be disposed adjacent to right belt edge 64. A portion of each of belt edge detectors 92, 94, 96, 98 is disposed in the belt edge detection region. The laser beam 46, 48, 50, 52 scanned by each scanner 24, 26, 28, 30 performs dual functions. Specifically, the laser beam 46, 48, 50, 52 is used to form a latent image on photoconductor belt 12, and to facilitate detection of left edge 62 by belt edge detectors 92, 94, 96, 98. The scanners 24, 26, 28, 30 advantageously provide both an inexpensive and precise light source for use in the belt edge detection process. The laser beams scanned by scanners 24, 26, 28, 30 enable detection of belt edge movement on the order of a fraction of a pixel size. In addition, belt detection can be synchronized relative to the pixel clock used for scanning. The scanners 24, 26, 28, 30 scan laser beams 46, 48, 50, 52 on a "full-time" basis. Thus, even when a laser beam 46, 48, 50, 52 emitted by a particular scanner 24, 26, 28, 30 is not being modulated to form a latent image, the scanner is scanning the laser beam in a scan line for purposes of belt edge detection. The scan line provided by each scanner 24, 26, 28, 30 extends in a direction perpendicular to the direction 44 of movement of the photoconductor belt. Movement of photoconductor belt 12 in a direction 44 perpendicular to the scan line produces a plurality of scan lines across the photodetector belt. Each scanner 24, 26, 28, 30 may include, for example, a laser diode for emitting a laser beam 46, 48, 50, 52, a scanning mechanism for scanning the laser beam across photoconductor belt 12, and optics for focusing the laser beam on the photoconductor belt. The scanning mechanism may comprise, for example, a multi-faceted rotating mirror controlled by a scan drive motor.

As an alternative to the use of scanners 24, 26, 28, 30 for belt edge detection, one or more additional scanners could be incorporated and dedicated to belt edge detection. The use of scanners 24, 26, 28, 30 for both imaging and belt edge detection is, however, very cost effective, less complex, and facilitates synchronization of belt edge detection with the imaging scanning process. As a further alternative, a self-scanned pixel array could be used instead of a photodiode. The self-scanned pixel array would not require the use of either scanners 24, 26, 28, 30 or dedicated belt edge detection scanners for a light source. The self-scanned pixel array generally would be effective in detecting belt edge movement, but likely would not be capable of providing detection resolution on the order of that provided by a scanned laser beam. Moreover, the pixel array would add cost and complexity to the overall imaging system. Nevertheless, the use of a dedicated scanner or a self-scanned pixel array could be suitable for some applications.

The computer 78 serves as a first scan controller, in accordance with the present invention, forming part of the scan control system. The computer 78 modulates the laser beam scanned by each scanner 24, 26, 28, 30 based on image data to form a latent image in imaging region 66 of photoconductor belt 12 with a plurality of image scan segments. Each of the image scan segments forms part of one of the scan lines. The computer 78 modulates the laser beam via laser drivers 80, 82, 84, 86, as indicated by line 104. The laser diode drivers 80, 82, 84, 86 drive the inputs of the laser diodes associated with scanners 24, 26, 28, 30, respectively, as indicated by lines 106, 108, 110, 112. The computer 78 modulates the laser beam to start each of the image scan segments at a particular point along the scan line. With reference to FIG. 2, each of the image scan segments ideally is started at left margin 68 of imaging region 66 for precise registration.

The scanner control and synchronization module 88 controls the scanning mechanism associated with each scanner 24, 26, 28, 30, as indicated by line 114. In particular, the scanner control and synchronization module 88 controls the scan rate of each scanning mechanism, and provides phase synchronization between the scanning mechanisms associated with the various scanners 24, 26, 28, 30. The scanner control and synchronization module 88 also generates image scan start signals for each scanner, as indicated by line 116. The image scan start signals provide computer 78 with an indication of the start of each image scan segment relative to a start-of-scan coordinate. The computer 78 controls the modulation of the laser beams 46, 48, 50, 52 scanned by scanners 24, 26, 28, 30 in response to the image scan start signals to start the image scan segment at an appropriate position relative to the start of each scan line.

Figure 4:
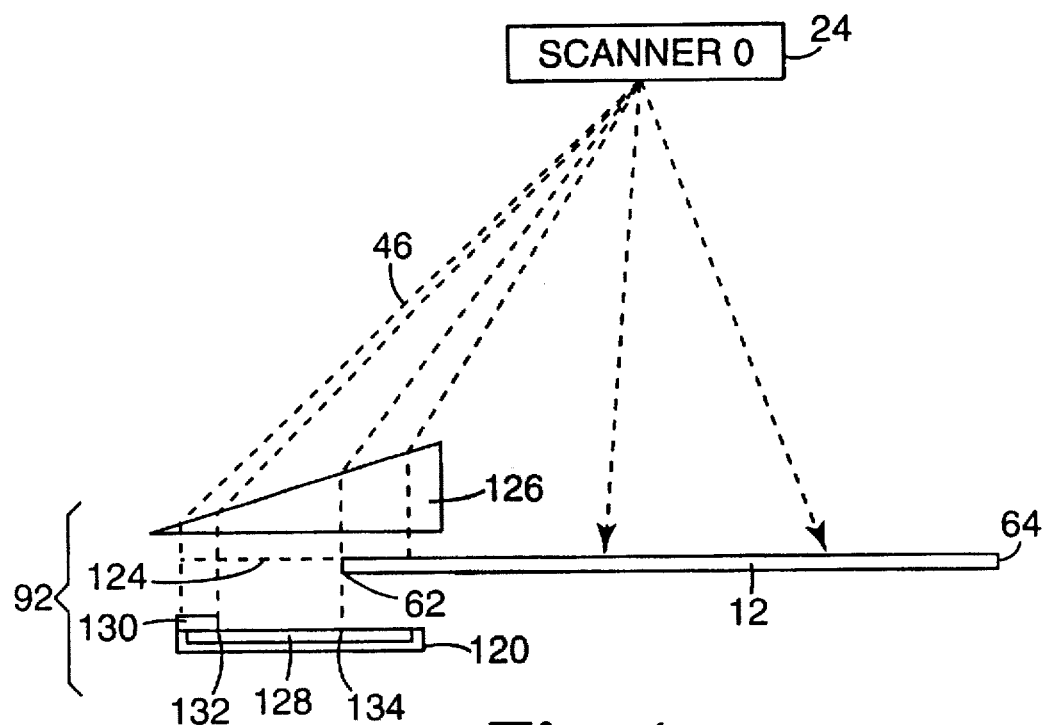
FIG. 4 is a schematic diagram illustrating an example of a belt edge detector for use with a registration system, in accordance with the present invention.

FIG. 4 is a schematic diagram illustrating an example of one of belt edge detectors 92, 94, 96, 98. As shown in FIG. 4, belt edge detector 92 includes a photodetector 120 that is disposed adjacent to left edge 62 of photoconductor belt 12, and on a side of the photoconductor belt opposite scanner 24. As also shown in FIG. 4, scanner 24 scans laser beam 46 across photoconductor belt 12 and photodetector 120 in a scan line 124. The photodetector 120 is positioned in alignment with scanner 24 relative to the direction 44 of movement of photoconductor belt 12 to receive laser beam 46 during a portion of scan line 124. An optical means in the form of a correcting prism 126 is disposed between scanner 24 and photodetector 120. The correcting prism 126 also is disposed between scanner 24 and photoconductor belt 12. The correcting prism 126 overlaps photodetector 120 and left belt edge 62, and directs laser beam 46 to be incident on the photodetector and on the left belt edge at an angle substantially perpendicular to photoconductor belt 12. The correcting prism 126 receives laser beam 46 at a position above photoconductor belt 12, and thereby prevents premature obstruction of the laser beam by left edge 62 due to vertical movement of the belt. The correcting prism 126 thereby ensures that such vertical movement will not be mistakenly perceived as side-to-side movement of photoconductor belt 12.

The photodetector 120 in each belt edge detector 92, 94, 96, 98 may comprise a photodiode having an active region 128 that overlaps left edge 62 of photoconductor belt 12. The photodiode should be sensitive to the wavelengths of the laser beam scanned by scanner 24. The non-overlapping portion of active region 128 occupies the belt edge detection region adjacent to left edge 62. The degree of overlap varies with the degree of side-to-side movement of left edge 62. Thus, the width of active region 128 should be large enough to overlap left edge 62 to at least some degree for the entire range of side-to-side movement of photoconductor belt 12. An example of a suitable photodiode is the OSD 60-3T photodiode, commercially available from Centronic, Inc., of Newbury Park, Calif.

The photodetector 120 in each belt edge detector 92, 94, 96, 98 generates a belt edge detection signal when the laser beam 46, 48, 50, 52 from the adjacent scanner 24, 26, 28, 30 is scanned across the belt edge detection region of the photodetector. In this exemplary embodiment, each of belt edge detectors 92, 94, 96, 98 continues to generate the belt edge detection signal until the laser beam is incident on left edge 62 of photoconductor belt 12. Alternatively, each of belt edge detectors 92, 94, 96, 98 could be disposed adjacent to right belt edge 64. As shown in FIG. 4, photodetector 120 may include a reference mask 130 positioned over an edge of active region 128. The reference mask 130 provides a precise edge at which photodetector 120 first receives laser beam 46, as indicated by reference numeral 132. When laser beam 46 is incident on active region 128 adjacent reference mask 130, the belt edge detection signal undergoes a transition from a first amplitude to a second amplitude. The belt edge detection signal remains at the second amplitude until laser beam 46 is incident on left edge 62, as indicated by reference numeral 134. When laser beam 46 is incident on left edge 62, photoconductor belt 12 blocks incidence of the laser beam on photodetector 120. As a result, the belt edge detection signal undergoes a transition from the second amplitude to the first amplitude. Thus, the position of belt edge 62 determines the duration of the belt edge detection signal at the second amplitude. In turn, the duration of the belt edge detection signal at the second amplitude provides a representation of the position of belt edge 62.

With further reference to FIG. 3, each of belt edge detectors 92, 94, 96, 98 transmits the belt edge detection signal to belt edge synthesizer 102, as indicated by line 136. In this example, belt edge synthesizer 102 operates, in combination with controller 100, scanner control and synchronization module 88, and computer 78, as a second scan controller forming part of the scan control system. The belt edge synthesizer 102 also operates, in combination with belt steering controller 103, to form part of the belt steering control system, as will be described later in this description. The second scan controller controls the modulation of the laser beam 46, 48, 50, 52 scanned by each scanner 24, 26, 28, 30 based on the belt edge detection signal generated by at least one of belt edge detectors 92, 94, 96, 98 to start each of the image scan segments at a substantially fixed distance relative to left edge 62 of photoconductor belt 12. In particular, belt edge synthesizer 102 transmits synthetic belt edge value signals for each scanner and for each scan line to scanner control and synchronization module 88, as indicated by line 138, based on the belt edge detection signals received from belt edge detectors 92, 94, 96, 98. The scanner control and synchronization module 88 generates image scan start signals for each scanner based on the synthetic belt edge value signals and transmits the image scan start signals to computer 78, as indicated by line 116. The computer 78 controls the timing of modulation of the laser beam 46, 48, 50, 52 for each scanner 24, 26, 28, 30 based on the image scan start signals to start each of the image scan segments at the substantially fixed distance relative to left edge 62 of the photoconductor belt 12.

The controller 100 may comprise, for example, a microprocessor or a programmable logic circuit. Prior to operation, computer 78 downloads a belt edge protection program to controller 100, as indicated by line 140. As an alternative, the belt edge detection program could be stored in a nonvolatile memory associated with controller 100. The controller 100 executes the program to control the operation of belt edge synthesizer 102. The belt edge synthesizer 102 may comprise, for example, a plurality of counters. Each counter corresponds to one of belt edge detectors 92, 94, 96, 98. The controller 100 loads each counter with an existing synthetic belt edge value, as indicated by line 142. The existing synthetic belt edge value is representative of a position of left edge 62 of photoconductor belt 12.

Each counter in belt edge synthesizer 102 begins counting down from the existing synthetic belt edge value at a known clock rate when the belt edge detection signal generated by the appropriate belt edge detector 92, 94, 96, 98 transitions to the second amplitude, indicating the first incidence of laser beam 46 on active region 128. The clock rate of the counters and the synthetic belt edge value are determined based on the pixel clock rate and the pixel size. In particular, the counter clock rate and synthetic belt edge value preferably are set sufficiently high to detect spatial movement of photoconductor belt 12 in gradations on the order of fractions of a pixel dimension. As an example, it is assumed that each scan line is formed with 600 pixels per inch (236 pixels per centimeter) at a pixel clock rate of $18 \times 10^6$ pixels per second, and that the position of left belt edge 62 ideally is 0.125 inches (0.317 centimeters) from reference mask 130. To detect spatial movement in gradations on the order of ⅙ of a pixel dimension (0.00028 inches or 0.0007 centimeters), the counters could be loaded with a synthetic belt edge value of 855 and counted down at a clock rate of 100 MHz.

The counter stops counting down when the appropriate belt edge detection signal transitions to the first amplitude, indicating incidence of laser beam 46 on left belt edge 62, or when the counter value has reached zero, whichever is later. If the belt edge detection signal transitions to the first amplitude prior to the counter reaching zero, the counter continues counting, but the count value at the time of transition is latched as a representation of the actual position of belt edge 62. If the belt edge detection signal transitions to the first amplitude after the counter has reached zero, the counter stops counting, and the "wrap-around" count value at the time of transition forms a representation of the actual position of belt edge 62. In either case, the final count value indicates the error between the actual belt edge position and the belt edge position represented by the synthetic belt edge value. The belt edge synthesizer 102 provides controller 100 with the count values from the various counters, as indicated by line 144. If the count value is greater than zero, left belt edge 62 has moved to the left to some degree. If the count value is less than zero, i.e., the counter has wrapped around and indicates a negative number, left belt edge 62 has moved to the right to some degree. For precise registration, the image scan segment of laser beam 46 must be shifted to the right or left as a function of the actual movement of left belt edge 62. To quantify the shift for computer 78, controller 100 generates a new synthetic belt edge value and reloads the counters in belt edge synthesizer 102 with the new synthetic belt edge value, as indicated by line 142.

The belt edge synthesizer 100 transmits the new synthetic belt edge value to scan control and synchronization module 88. The controller 100 and belt edge synthesizer 102 could generate the synthetic belt edge value with a single counter based on the belt edge detection signal generated by a single belt edge detector 92, 94, 96, 98. In the example of FIG. 3, however, four belt edge detectors 92, 94, 96, 98 are positioned along the length of photoconductor belt 12 and aligned with respective scanners 24, 26, 28, 30. The use of four belt edge detectors 92, 94, 96, 98 facilitates identification of defects in left belt edge 62 by comparison of the outputs of the various belt edge detectors. Defects such as indentations could exist along left belt edge 62 due to damage during use or imprecise manufacturing. A defect could cause a single belt edge detector to detect a false position for left belt edge 62. To avoid the detection of false belt edge positions, it is desirable to filter out belt edge detection signals generated as a result of defects. In the example of FIG. 3, controller 100 processes the counter values generated by belt edge synthesizer 102 for each of belt edge detectors 92, 94, 96, 98 to identify those signals associated with defects.

Figure 5:
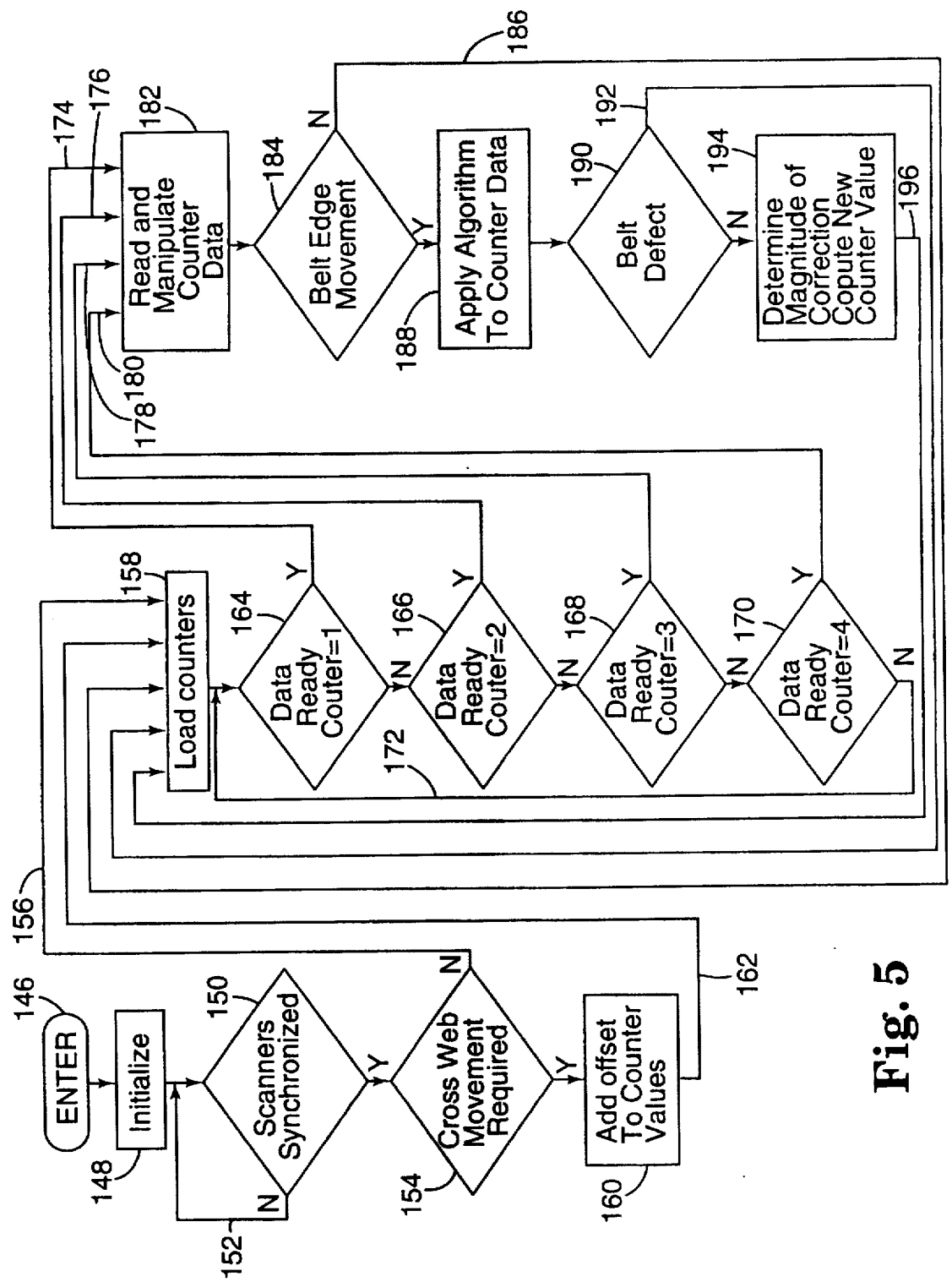
FIG. 5 is a flow diagram illustrating operation of an exemplary belt edge detection process implemented by a registration system, in accordance with the present invention.

FIG. 5 is a flow diagram illustrating operation of a belt edge detection process implemented by a registration system, in accordance with the present invention. FIG. 5 illustrates, in particular, the operation of controller 100 and belt edge synthesizer 102 under the control of controller 100. As shown in FIG. 5, upon start-up, indicated by block 146, computer 78 first initializes system 76, as indicated by block 148. At initialization, computer 78 downloads the belt edge detection program to controller 100, as indicated by line 140 in FIG. 3. Alternatively, the belt edge detection program could reside in non-volatile memory associated with controller 100. As indicated by block 150 in FIG. 5, controller 100 determines whether the various scanners 24, 26, 28, 30 are synchronized with one another. If scanners 24, 26, 28, 30 are not synchronized, controller 100 waits for synchronization, as indicated by loop 152. Upon synchronization, controller 100 determines whether a cross-web movement is required, as indicated by block 154. Cross-web movement refers to a shift in a direction perpendicular to the direction 44 of movement of belt 12. The controller 100 adds a cross-web movement to the images formed by the respective scanner 24, 26, 28, 30 as necessary to correct for spatial misalignment of the reference masks 130 of belt edge detectors 92, 94, 96, 98.

The controller 100 implements the shift, if necessary, by adjusting the synthetic belt edge value loaded into the counter associated with the particular scanner 24, 26, 28, 30 in need of correction. If no cross-web movement is required, controller 100 does not adjust the existing synthetic belt edge value. Rather, controller 100 proceeds to load the counters in belt edge synthesizer 102 with the existing synthetic belt edge value, as indicated by line 156 and block 158. If cross-web movement is required, controller 100 adjusts the synthetic belt edge value with an offset that reflects the degree of movement necessary for correction, as indicated by block 160. The controller 100 then loads the appropriate counters in belt edge synthesizer 102 with adjusted synthetic belt edge values, as indicated by line 162 and block 158.

The belt edge synthesizer 102 then waits for scanners 24, 26, 28, 30 to begin scanning laser beam 46 across active region 128 of photodetector 120, and for the respective counters to produce a final count value, as indicated by blocks 164, 166, 168, 170, and loop 172. When a counter provides a final count value for the scan line, belt edge synthesizer 102 provides the final count value to controller 100, as indicated by lines 174, 176, 178, 180. The controller 100 processes the final count values, as indicated by block 182, and determines whether the final count values are representative of movement of left belt edge 62, as indicated by block 184. The controller 100 determines whether movement has occurred by comparing the final count value to the existing synthetic belt edge value. As previously described, if the count value is greater than zero, left belt edge 62 has moved to the left to some degree. If the count value is less than zero, i.e., the counter has wrapped around, left belt edge 62 has moved to the right to some degree. If the count value is exactly zero, no movement has occurred. If no movement has occurred, controller 100 reloads the counters with the existing synthetic belt edge values, as indicated by line 186. The belt edge synthesizer 102 then transmits the existing synthetic belt edge values to scan control and synchronization module 88, as indicated by line 138.

If controller 100 determines that left belt edge 62 has moved, the controller applies an algorithm to the final counter values to filter out values resulting from belt edge detection signals associated with defects in the left belt edge, as indicated by block 188. The algorithm enables controller 100 to disregard the belt edge detection signals associated with such defects for control of the modulation of the laser beams. The algorithm determines if actual belt motion has occurred by determining the rate of change in the final counter value for the counters associated with each of scanners 24, 26, 28, 30. The algorithm saves a delta count value representing a change in the count value between the previous two scan lines for each counter. The algorithm compares the saved delta count value to a delta count value representing a change in the count value between the present scan line and the previous scan line.

If the delta count value for a counter associated with a particular scanner 24, 26, 28, 30 indicates that belt movement has occurred, the algorithm interrogates the other three counters in the same manner to determine if a similar delta count value has been observed. If only one counter has observed a change in the delta count value, a belt defect has been encountered. In this case, the counter is loaded with the previous synthetic belt edge value, which does not provide any correction for belt movement. If all four counters indicate a similar delta count value, however, actual belt movement has occurred. In this case, each of the counters is loaded with a new synthetic belt edge value representing a necessary correction for belt movement. Thus, based on the algorithm, controller 100 identifies final count values for belt edge detection signals associated with defects, as indicated by block 190. If the algorithm indicates that a final count value is the result of a belt edge defect, controller 100 disregards the final count value. In this case, controller 100 reloads the counters with the existing synthetic belt edge value, as indicated by line 192. If the algorithm indicates that the final count value is not the result of a belt edge defect, controller 100 determines the magnitude of the correction required by the laser beams, as indicated by block 194. The controller 100 adjusts the existing synthetic belt edge values according to the necessary correction, and reloads the counters in belt edge synthesizer 102 with the new synthetic belt edge values, as indicated by line 196. It may be desirable to set a maximum correction value per scan line to avoid sudden adjustments that could be visible in the final multi-color image.

The belt edge synthesizer 102 provides each new synthetic belt edge value to scan control and synchronization module 88. In response, scan control and synchronization module 88 generates image scan start signals at appropriate times relative to the start of scan of each of scanners 24, 26, 28, 30. The computer 78 starts modulation of each laser beam in response to the image scan start signals for the particular laser beam. Based on the synthetic belt edge value and a pixel clock, scan control and synchronization module 88 times the image scan start signals for each scanner 24, 26, 28, 30 so that computer 78 controls the modulation of each laser beam to start each of the image scan segments at a substantially fixed distance relative to the left edge 62 of photoconductor belt 12. In this manner, computer 78 controls the modulation of each laser beam 46, 48, 50, 52 based on the belt edge detection signal generated by the scan line of the particular laser beam.

The belt edge synthesizer 102 also operates, in combination with belt steering controller 103, to form part of a belt steering control system in accordance with the present invention. In particular, belt edge synthesizer 102 transmits the synthetic belt edge value signals for each scanner and for each scan line to belt steering controller 103, as indicated by line 39, based on the belt edge detection signals received from belt edge detectors 92, 94, 96, 98. The synthetic belt edge value signals provide belt steering controller 103 with an indication of the current position of photoconductor belt 12 relative to the ideal transport path extending in direction 44. Based on the synthetic belt edge values, belt steering controller 103 controls a belt steering mechanism to move photoconductor belt 12 in the direction substantially perpendicular to the continuous path of the belt in direction 44. The belt steering controller 103 controls the belt steering mechanism based on the synthetic belt edge value signals to reduce deviation of photoconductor belt 12 from the continuous path. Thus, belt steering controller 103 may comprise, for example, driver circuitry for driving belt steering mechanism in combination with control circuitry for processing the synthetic belt edge value signals and controlling the driver circuitry based on the synthetic belt edge value signals. The reduction in deviation by the belt steering mechanism may provide more precise registration of the image scan segments formed with laser beams 46, 48, 50, 52 scanned by scanners 24, 26, 28, 30, thereby enhancing the registration of the resultant latent images on photoconductor belt 12. In addition, the reduced deviation prevents damage to photoconductor belt 12 and helps keep the belt on the transport rollers.

Figure 6:
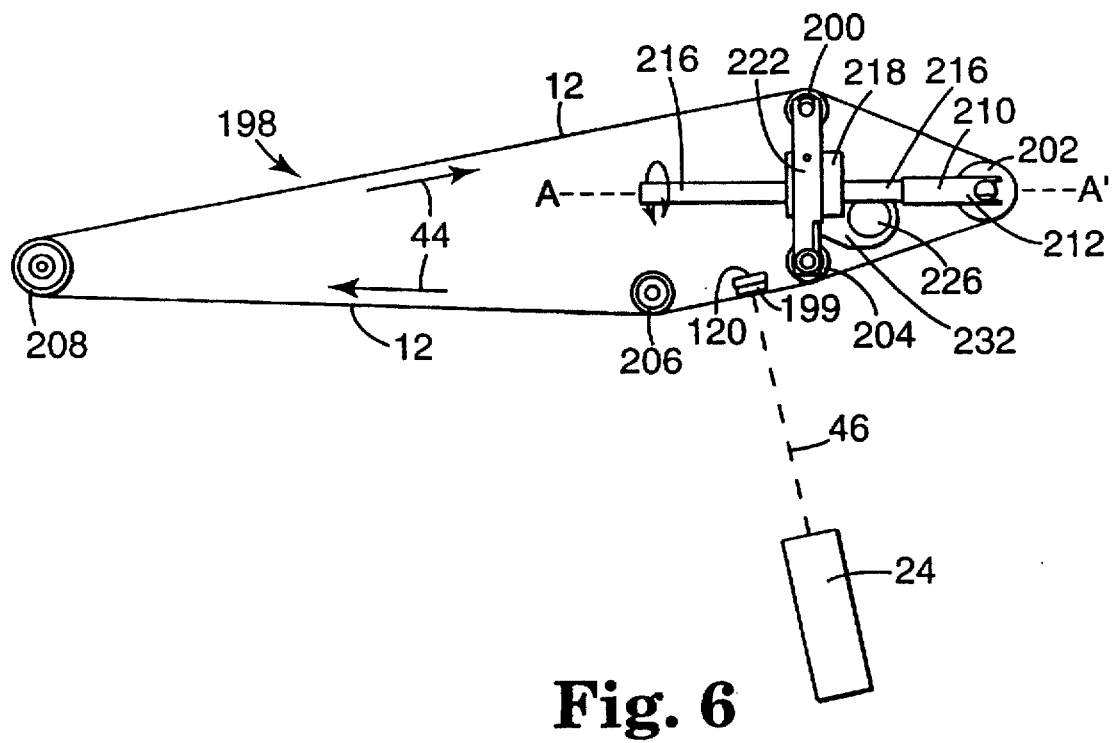
FIG. 6 is a side view of an exemplary photoconductor belt apparatus that makes use of a belt steering control system useful in a registration system, in accordance with the present invention.
Figure 7:
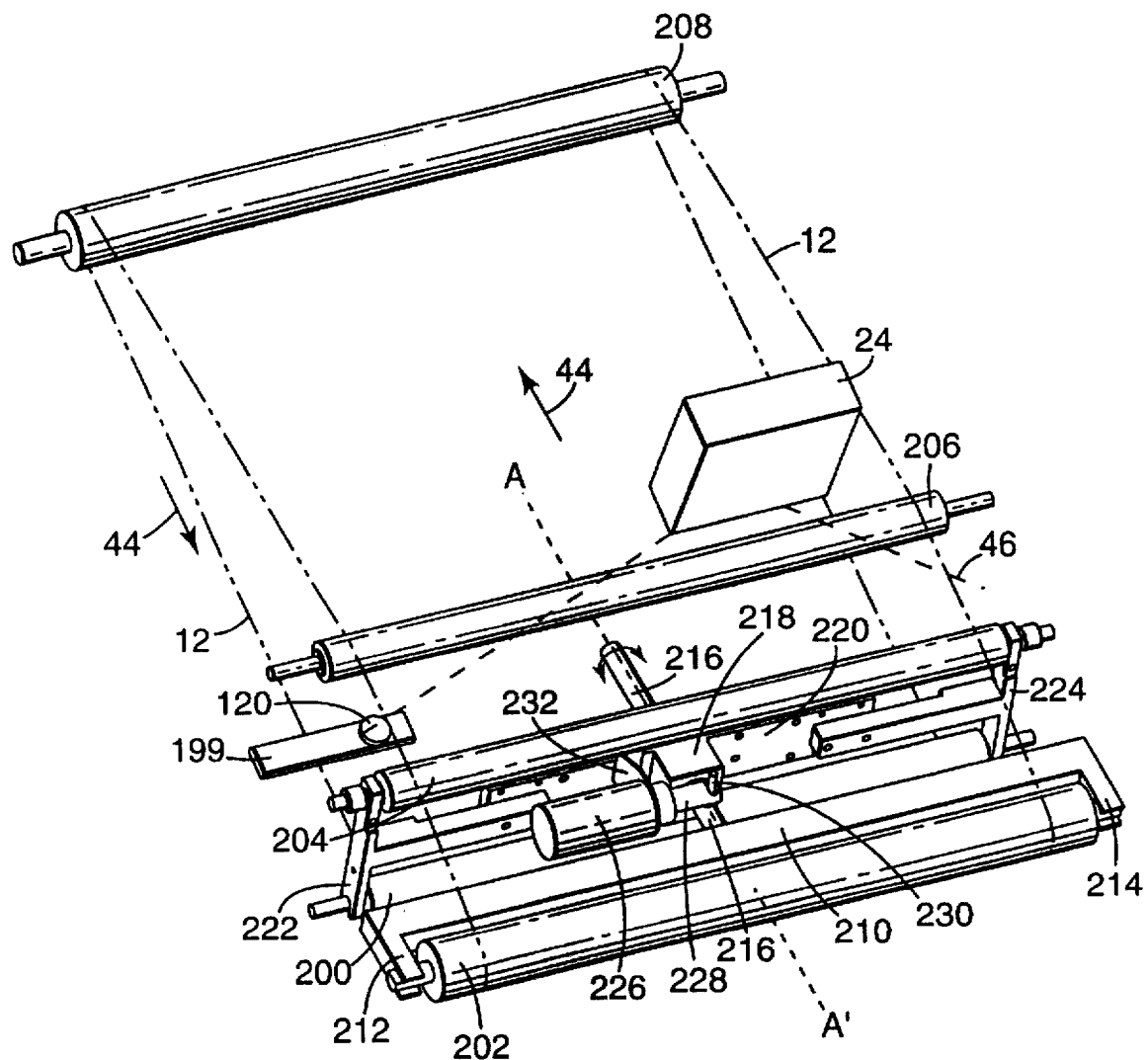
FIG. 7 is a bottom perspective view of the photoconductor belt apparatus of FIG. 6.
Figure 8A:
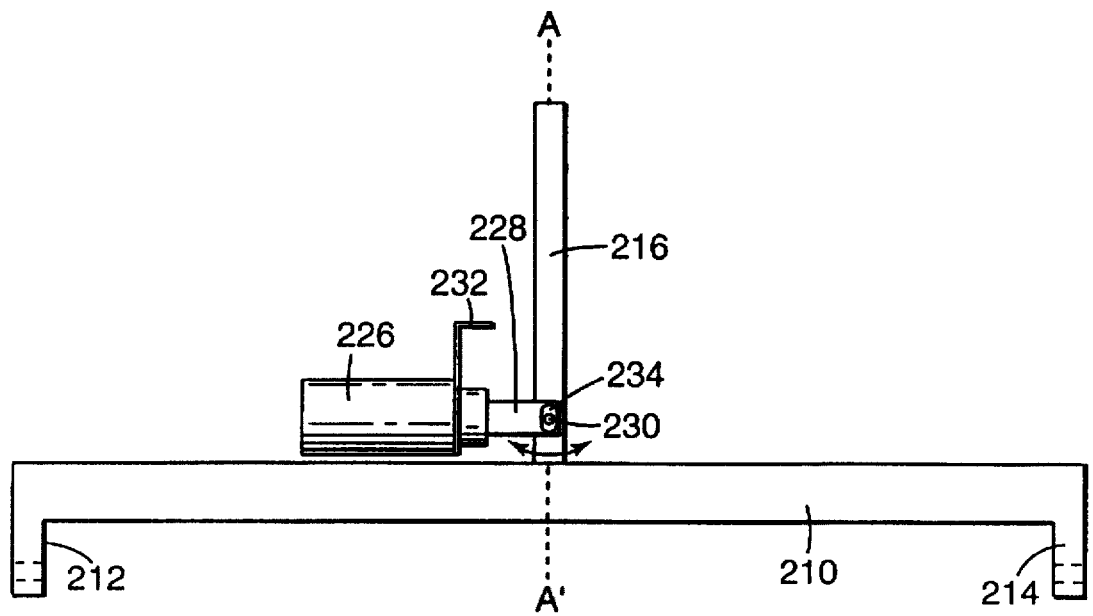
FIG. 8A is a front view of a belt steering mechanism useful in the belt steering control system of FIG. 6.
Figure 8B:
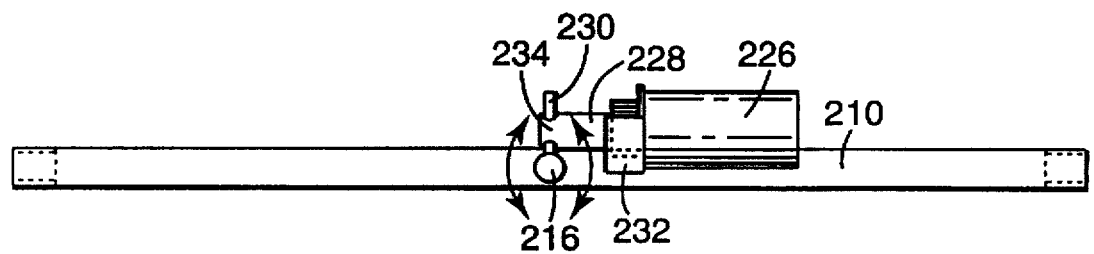
FIG. 8B is a top plan view of the belt steering mechanism of FIG. 8B.

FIGS. 6 and 7 illustrate an exemplary photoconductor belt apparatus 198 that makes use of a belt steering control system useful in a registration system, in accordance with the present invention. For ease of illustration, FIG. 7 shows only one of the plurality of scanners 24, 26, 28, 30 ordinarily positioned to scan laser beams 46, 48, 50, 52 across photoconductor belt 12, and one of belt edge detectors 92, 94, 96, 98. FIGS. 6 and 7 show the belt edge detector as a photodetector 120 mounted on a circuit board 199. In the exemplary apparatus of FIGS. 6 and 7, photoconductor belt 12 is mounted about a plurality of rollers 200, 202, 204, 206, 208. The shaft of one of rollers 200, 202, 204, 206, 208 is coupled to a drive mechanism such as a motor (not shown) either directly or via any of a variety of drive transmissions. The drive mechanism drives the roller, which frictionally drives photoconductor belt 12 to move about rollers 200, 203, 204, 206, 208 in a continuous transport path in the direction indicated by arrow 44. As shown in FIGS. 6 and 7, roller 202 is supported on a pivotable carriage 210 that forms part of a belt steering mechanism, in accordance with the present invention. FIGS. 8A and 8B further illustrate carriage 210. The pivotable carriage 210 includes a pair of carriage mounts 212, 214. Each of the carriage mounts 212, 214 retains one end of the shaft of roller 202. The carriage 210 is mounted in a fixed manner to a carriage pin 216. The carriage pin 216 mounts to a central portion of carriage 210. The carriage 210 moves photoconductor belt 12 in a direction perpendicular to the transport path by rotation about a steering axis A-A' coincident with the longitudinal axis of carriage pin 216. To enable rotation, carriage pin 210 is mounted in a journal bearing (not shown) in a support block 218. The support block 218 includes a support plate 220. First and second block mounts 222, 224 are coupled to support plate 220. The first and second block mounts 222, 224 retain opposite ends of the shafts associated with rollers 200 and 204.

In this example, the belt steering mechanism functions as a roller adjustment mechanism that adjusts a position of roller 202 to move photoconductor belt 12. The roller adjustment mechanism may be realized by a variety of different mechanisms. As illustrated by the example of FIGS. 6, 7, 8A, and 8B, the roller adjustment mechanism may include a solenoid 226 having an actuator 228 coupled to an actuator pin 230 extending outward from carriage pin 216. A number of different actuating mechanisms could be used such as, for example, a stepper motor. The solenoid 226 is mounted on a bracket 232 coupled to support block 218. The actuator pin 230 extends through an aperture 234 in actuator 228 of solenoid 226. The actuator extends perpendicular to carriage pin 216 and, consequently, steering axis A-A'. The belt steering controller 103 transmits a signal that selectively energizes and de-energizes solenoid 226 to move actuator 228 inward and outward relative to the solenoid. The actuator 228 thereby moves actuator pin 230 to rotate carriage pin 216 in the journal bearing in support block 210. The rotation of carriage pin 216 adjusts the attitude of roller 202 relative to the other rollers 200, 204, 206, 208, 210. The photoconductor belt 12 tends to move in a direction perpendicular to the continuous transport path in response to adjustment of the position of roller 202. In particular, photoconductor belt 12 tends to walk laterally along roller 202 in response to the variation in the attitude of the roller.

The belt steering controller 103 controls the belt steering mechanism based on the belt edge detection signals generated by photodetectors 92, 94, 96, 98 and, more specifically, based on the synthetic edge value generated by belt edge synthesizer 102 to reduce deviation of photoconductor belt 12 from the continuous transport path. In this manner, belt steering controller 103 reduces significant deviation that can lead to misregistration of the latent images formed by scanners 24, 26, 28, 30 on photoconductor belt 12. The belt steering controller 103 may be configured to energize solenoid 226 based on the synthetic edge value for a period of time sufficient for photoconductor belt 12 to walk along roller 202 to the appropriate lateral position in the transport path. The period of time can be determined based on the position information provided by the synthetic edge value and knowledge of the rate of movement characteristics of photoconductor belt 12 along roller 202. The belt steering controller 103 also could be configured to energize solenoid 226 for period of time until the belt edge detection signals, and thus the synthetic belt edge value, indicates that the position of the belt edge has returned to the proper position.

Alternatively, solenoid 226 may be configured to move actuator 228 between multiple positions in response to different levels of energization, or different control signals. In this case, based on the synthetic edge value, belt steering controller 103 may be configured to apply to solenoid 226 a signal that drives actuator 228 to a particular position. The particular position can be selected to achieve a degree rotation of carriage pin 216 sufficient for photoconductor belt 12 to walk to the appropriate lateral position. As another alternative, belt steering controller 103 can be configured to modulate both energization time and position of solenoid 226 to achieve desired movement of photoconductor belt 12.

As with the scan control system, solenoid 226 and belt steering controller 103 may be configured to provide no more than a maximum degree of movement of photoconductor belt 12 in a given time to avoid sudden adjustments that could be visible in the final multi-color image. Further, belt steering controller 103 may be configured to control solenoid 226 in response to the synthetic edge value received for each scan line, as with the scan control system. However, it may be sufficient to engage the belt steering system on a less frequent basis, such as for every n scan lines, particularly when the scan control system of the present invention is used.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A system for registration of a latent image on a photoconductor belt, the system comprising:

a photoconductor belt mounted about a plurality of rollers;

a drive mechanism for driving the photoconductor belt to move about the rollers in a continuous path, wherein the photoconductor belt tends to deviate from the continuous path in a direction substantially perpendicular to the continuous path;

a photodetector disposed to overlap an edge of the photoconductor belt;

a scanner for scanning a laser beam across the moving photoconductor belt and across the photodetector, the photodetector generating a belt edge detection signal when the laser beam is scanned across the photodetector;

a scan controller for modulating the laser beam based on image data to form the latent image on the photoconductor belt;

a belt steering mechanism for moving the photoconductor belt in the direction substantially perpendicular to the continuous path; and a belt steering controller for controlling the belt steering mechanism based on the belt edge detection signal to reduce deviation of the photoconductor belt from the continuous path.

2. The system of claim 1, further comprising optical means, disposed between the scanner and the photodetector, for directing the laser beam to be incident on the photodetector at an angle substantially perpendicular to the photoconductor belt, and incident on the edge of the photoconductor belt at an angle substantially perpendicular to the photoconductor belt.

3. The system of claim 2, wherein the optical means includes a prism disposed between the scanner and the photoconductor belt, wherein the prism overlaps the photodetector and the edge of the photoconductor belt.

4. The system of claim 1, wherein the belt steering mechanism comprises a roller adjustment mechanism for adjusting a position of one of the rollers, wherein the photoconductor belt tends to move in the direction substantially perpendicular to the continuous path in response to adjustment of the position of the respective roller.

5. The system of claim 1, wherein the photodetector continues to generate the belt edge detection signal until the laser beam is incident on the edge of the photoconductor belt, and wherein the belt steering controller includes means for determining a position of the edge of the photoconductor belt based on a duration of the belt edge detection signal, the belt steering controller controlling the belt steering mechanism based on the determined position.

6. The system of claim 1, wherein the scanner scans the laser beam across the photoconductor belt in a plurality of scan lines, and the scan controller is a first scan controller, the first scan controller modulating the laser beam based on the image data to form the latent image on the photoconductor belt with a plurality of image scan segments, each of the image scan segments forming part of one of the scan lines, the system further comprising a second scan controller for controlling the modulation of the laser beam based on the belt edge detection signal to start each of the image scan segments at a substantially fixed distance relative to the edge of the photoconductor belt.

7. A system for registration of a plurality of latent images on a photoconductor belt, the system comprising:

a photoconductor belt mounted about a plurality of rollers;

a drive mechanism for driving the photoconductor belt to move about the rollers in a continuous path, wherein the photoconductor belt tends to deviate from the continuous path in a direction substantially perpendicular to the continuous path;

a photodetector disposed to overlap an edge of the photoconductor belt;

a first scanner for scanning a first laser beam across the moving photoconductor belt and across the photodetector, the photodetector generating a belt edge detection signal when the first laser beam is scanned across the photodetector;

a second scanner for scanning a second laser beam across the moving photoconductor belt;

a scan controller for modulating the first laser beam based on first image data to form a first latent image on the photoconductor belt, and modulating the second laser beam based on second image data to form a second latent image on the photoconductor belt;

a belt steering mechanism for moving the photoconductor belt in the direction substantially perpendicular to the continuous path; and a belt steering controller for controlling the belt steering mechanism based on the belt edge detection signal to reduce deviation of the photoconductor belt from the continuous path.

8. The system of claim 7, further comprising optical means, disposed between the first scanner and the photodetector, for directing the first laser beam to be incident on the photodetector at an angle substantially perpendicular to the photoconductor belt, and incident on the edge of the photoconductor belt at an angle substantially perpendicular to the photoconductor belt.

9. The system of claim 8, wherein the optical means includes a prism disposed between the first scanner and the photoconductor belt, wherein the prism overlaps the photodetector and the edge of the photoconductor belt.

10. The system of claim 7, wherein the belt steering mechanism comprises a roller adjustment mechanism for adjusting a position of one of the rollers, wherein the photoconductor belt tends to move in the direction substantially perpendicular to the continuous path in response to adjustment of the position of the respective roller.

11. The system of claim 7, wherein the photodetector continues to generate the belt edge detection signal until the first laser beam is incident on the edge of the photoconductor belt, and wherein the belt steering controller includes means for determining a position of the edge of the photoconductor belt based on a duration of the belt edge detection signal, the belt steering controller controlling the belt steering mechanism based on the determined position.

12. The system of claim 7, wherein the first scanner scans the first laser beam across the photoconductor belt in a plurality of first scan lines, the second scanner scans the second laser beam across the photoconductor belt in a plurality of second scan lines, and the scan controller is a first scan controller, the first scan controller modulating the first laser beam based on the first image data to form the first latent image on the photoconductor belt with a plurality of first image scan segments, each of the first image scan segments forming part of one of the first scan lines, and the first scan controller modulating the second laser beam based on the second image data to form the second latent image on the photoconductor belt with a plurality of second image scan segments, each of the second image scan segments forming part of one of the second scan lines, the system further comprising a second scan controller for controlling the modulation of the first laser beam based on the belt edge detection signal to start each of the first image scan segments at a substantially fixed distance relative to the edge of the photoconductor belt, and for controlling the modulation of the second laser beam based on the belt edge detection signal to start each of the second image scan segments at the substantially fixed distance relative to the edge of the photoconductor belt.

13. The system of claim 7, further comprising a third scanner for scanning a third laser beam across the moving photoconductor belt, the scan controller modulating the third laser beam based on third image data to form a third latent image on the photoconductor belt, and a fourth scanner for scanning a fourth laser beam across the moving photoconductor belt, the scan controller modulating the fourth laser beam based on fourth image data to form a fourth latent image on the photoconductor belt.

14. The system of claim 13, wherein the first scanner scans the first laser beam across the photoconductor belt in a plurality of first scan lines, the second scanner scans the second laser beam across the photoconductor belt in a plurality of second scan lines, the third scanner scans the third laser beam across the photoconductor belt in a plurality of third scan lines, the fourth scanner scans the fourth laser beam across the photoconductor belt in a plurality of fourth scan lines, and the scan controller is a first scan controller, the first scan controller modulating the first laser beam based on the first image data to form the first latent image on the photoconductor belt with a plurality of first image scan segments, each of the first image scan segments forming part of one of the first scan lines, the first scan controller modulating the second laser beam based on the second image data to form the second latent image on the photoconductor belt with a plurality of second image scan segments, each of the second image scan segments forming part of one of the second scan lines, the first scan controller modulating the third laser beam based on the third image data to form the third latent image on the photoconductor belt with a plurality of third image scan segments, each of the third image scan segments forming part of one of the third scan lines, and the first scan controller modulating the fourth laser beam based on the fourth image data to form the fourth latent image on the photoconductor belt with a plurality of fourth image scan segments, each of the fourth image scan segments forming part of one of the fourth scan lines, the system further comprising a second scan controller for controlling the modulation of the first laser beam based on the belt edge detection signal to start each of the first image scan segments at a substantially fixed distance relative to the edge of the photoconductor belt, for controlling the modulation of the second laser beam based on the belt edge detection signal to start each of the second image scan segments at the substantially fixed distance relative to the edge of the photoconductor belt, for controlling the modulation of the third laser beam based on the belt edge detection signal to start each of the third image scan segments at the substantially fixed distance relative to the edge of the photoconductor belt, and for controlling the modulation of the fourth laser beam based on the belt edge detection signal to start each of the fourth image scan segments at the substantially fixed distance relative to the edge of the photoconductor belt.

15. A system for registration of a plurality of latent images on a photoconductor belt, the system comprising:

a photoconductor belt mounted about a plurality of rollers;

a drive mechanism for driving the photoconductor belt to move about the rollers in a continuous path, wherein the photoconductor belt deviates from the continuous path in a direction substantially perpendicular to the continuous path;

a first photodetector disposed to overlap an edge of the photoconductor belt;

a second photodetector disposed to overlap the edge of the photoconductor belt;

a first scanner for scanning a first laser beam across the moving photoconductor belt and across the first photodetector, the first photodetector generating a first belt edge detection signal when the first laser beam is scanned across the first photodetector;

a second scanner for scanning a second laser beam across the moving photoconductor belt and across the second photodetector, the second photodetector generating a second belt edge detection signal when the second laser beam is scanned across the second photodetector;

a scan controller for modulating the first laser beam based on first image data to form a first latent image on the photoconductor belt, and modulating the second laser beam based on second image data to form a second latent image on the photoconductor belt;

a belt steering mechanism for moving the photoconductor belt in the direction substantially perpendicular to the continuous path; and a belt steering controller for controlling the belt steering mechanism based on the first belt edge detection signal and the second belt edge detection signal to reduce deviation of the photoconductor belt from the continuous path.

16. The system of claim 15, further comprising first optical means, disposed between the first scanner and the first photodetector, for directing the first laser beam to be incident on the photodetector at an angle substantially perpendicular to the photoconductor belt, and incident on the edge of the photoconductor belt at an angle substantially perpendicular to the photoconductor belt, and second optical means, disposed between the second scanner and the second photodetector, for directing the second laser beam to be incident on the photodetector at an angle substantially perpendicular to the photoconductor belt, and incident on the edge of the photoconductor belt at an angle substantially perpendicular to the photoconductor belt.

17. The system of claim 16, wherein the first optical means includes a first prism disposed between the first scanner and the photoconductor belt, wherein the prism overlaps the first photodetector and the edge of the photoconductor belt, and the second optical means includes a second prism disposed between the second scanner and the photoconductor belt, wherein the second prism overlaps the second photodetector and the edge of the photoconductor belt.

18. The system of claim 15, wherein the belt steering mechanism comprises a roller adjustment mechanism for adjusting a position of one of the rollers, wherein the photoconductor belt tends to move in the direction substantially perpendicular to the continuous path in response to adjustment of the position of the respective roller.

19. The system of claim 15, wherein the first photodetector continues to generate the first belt edge detection signal until the first laser beam is incident on the edge of the photoconductor belt, the second photodetector continues to generate the second belt edge detection signal until the second laser beam is incident on the edge of the photoconductor belt, and wherein the belt steering controller includes means for determining a position of the edge of the photoconductor belt based on a duration of the first belt edge detection signal and a duration of the second belt edge detection signal, the belt steering controller controlling the belt steering mechanism based on the determined position.

20. The system of claim 15, wherein the first scanner scans the first laser beam across the photoconductor belt in a plurality of first scan lines, the second scanner scans the second laser beam across the photoconductor belt in a plurality of second scan lines, and the scan controller is a first scan controller, the first scan controller modulating the first laser beam based on the first image data to form the first latent image on the photoconductor belt with a plurality of first image scan segments, each of the first image scan segments forming part of one of the first scan lines, and the first scan controller modulating the second laser beam based on the second image data to form the second latent image on the photoconductor belt with a plurality of second image scan segments, each of the second image scan segments forming part of one of the second scan lines, the system further comprising a second scan controller for controlling the modulation of the first laser beam based on the first belt edge detection signal and the second belt edge detection signal to start each of the first image scan segments at a substantially fixed distance relative to the edge of the photoconductor belt, and for controlling the modulation of the second laser beam based on the first belt edge detection signal and the second belt edge detection signal to start each of the second image scan segments at the substantially fixed distance relative to the edge of the photoconductor belt.

21. The system of claim 15, further comprising a third scanner for scanning a third laser beam across the moving photoconductor belt, the scan controller modulating the third laser beam based on third image data to form a third latent image on the photoconductor belt, and a fourth scanner for scanning a fourth laser beam across the moving photoconductor belt, the scan controller modulating the fourth laser beam based on fourth image data to form a fourth latent image on the photoconductor belt.

22. The system of claim 21, wherein the first scanner scans the first laser beam across the photoconductor belt in a plurality of first scan lines, the second scanner scans the second laser beam across the photoconductor belt in a plurality of second scan lines, the third scanner scans the third laser beam across the photoconductor belt in a plurality of third scan lines, the fourth scanner scans the fourth laser beam across the photoconductor belt in a plurality of fourth scan lines, and the scan controller is a first scan controller, the first scan controller modulating the first laser beam based on the first image data to form the first latent image on the photoconductor belt with a plurality of first image scan segments, each of the first image scan segments forming part of one of the first scan lines, the first scan controller modulating the second laser beam based on the second image data to form the second latent image on the photoconductor belt with a plurality of second image scan segments, each of the second image scan segments forming part of one of the second scan lines, the first scan controller modulating the third laser beam based on the third image data to form the third latent image on the photoconductor belt with a plurality of third image scan segments, each of the third image scan segments forming part of one of the third scan lines, and the first scan controller modulating the fourth laser beam based on the fourth image data to form the fourth latent image on the photoconductor belt with a plurality of fourth image scan segments, each of the fourth image scan segments forming part of one of the fourth scan lines, the system further comprising a second scan controller for controlling the modulation of the first laser beam based on the first and second belt edge detection signals to start each of the first image scan segments at a substantially fixed distance relative to the edge of the photoconductor belt, for controlling the modulation of the second laser beam based on the first and second belt edge detection signals to start each of the second image scan segments at the substantially fixed distance relative to the edge of the photoconductor belt, for controlling the modulation of the third laser beam based on the first and second belt edge detection signals to start each of the third image scan segments at the substantially fixed distance relative to the edge of the photoconductor belt, and for controlling the modulation of the fourth laser beam based on the first and second belt edge detection signals to start each of the fourth image scan segments at the substantially fixed distance relative to the edge of the photoconductor belt.

23. A system for steering a photoconductor belt, the system comprising:
    a photoconductor belt mounted about a plurality of rollers;
    a drive mechanism for driving the photoconductor belt to move about the rollers in a continuous path, wherein the photoconductor belt tends to deviate from the continuous path in a direction substantially perpendicular to the continuous path;
    a photodetector disposed to overlap an edge of the photoconductor belt;
    a scanner for scanning a laser beam across at least a portion of the moving photoconductor belt and across the photodetector, the photodetector generating a belt edge detection signal when the laser beam is scanned across the photodetector;
    a belt steering mechanism for moving the photoconductor belt in the direction substantially perpendicular to the continuous path; and
    a belt steering controller for controlling the belt steering mechanism based on the belt edge detection signal to reduce deviation of the photoconductor belt from the continuous path.

24. The system of claim 23, further comprising optical means, disposed between the scanner and the photodetector, for directing the laser beam to be incident on the photodetector at an angle substantially perpendicular to the photoconductor belt, and incident on the edge of the photoconductor belt at an angle substantially perpendicular to the photoconductor belt.

25. The system of claim 24, wherein the optical means includes a prism disposed between the scanner and the photoconductor belt, wherein the prism overlaps the photodetector and the edge of the photoconductor belt.

26. The system of claim 23, wherein the belt steering mechanism comprises a roller adjustment mechanism for adjusting a position of one of the rollers, wherein the photoconductor belt tends to move in the direction substantially perpendicular to the continuous path in response to adjustment of the position of the respective roller.

27. The system of claim 23, wherein the photodetector continues to generate the belt edge detection signal until the laser beam is incident on the edge of the photoconductor belt, and wherein the belt steering controller includes means for determining a position of the edge of the photoconductor belt based on a duration of the belt edge detection signal, the belt steering controller controlling the belt steering mechanism based on the determined position.

* * * * *